US012574326B2

(12) United States Patent
Fang

(10) Patent No.: US 12,574,326 B2
(45) Date of Patent: Mar. 10, 2026

(54) NETWORK LOAD BALANCING METHOD AND APPARATUS, ELECTRONIC DEVICE, MEDIUM, AND PROGRAM PRODUCT

(71) Applicant: Beijing Bytedance Network Technology Co., Ltd., Beijing (CN)

(72) Inventor: Ruomin Fang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 20 days.

(21) Appl. No.: 18/560,866

(22) PCT Filed: Oct. 21, 2022

(86) PCT No.: PCT/CN2022/126674
§ 371 (c)(1),
(2) Date: Nov. 14, 2023

(87) PCT Pub. No.: WO2023/116165
PCT Pub. Date: Jun. 29, 2023

(65) Prior Publication Data
US 2024/0259316 A1     Aug. 1, 2024

(30) Foreign Application Priority Data

Dec. 21, 2021     (CN) .......................... 202111571274.2

(51) Int. Cl.
*H04L 47/125* (2022.01)
*H04L 45/24* (2022.01)

(52) U.S. Cl.
CPC ............ *H04L 47/125* (2013.01); *H04L 45/24* (2013.01)

(58) Field of Classification Search
CPC ............. H04L 67/1004; H04L 67/1027; H04L 47/125; H04L 45/24; H04L 9/08; H04L 69/08; H04L 69/22
See application file for complete search history.

(56) References Cited

U.S. PATENT DOCUMENTS 10,476,992 B1    11/2019  Amdahl
2012/0331160 A1*  12/2012  Tremblay ................ H04L 67/56
709/228

(Continued)

FOREIGN PATENT DOCUMENTS

CN        108353334 A      7/2018
CN        108667880 A     10/2018
(Continued)

OTHER PUBLICATIONS

M. Morawski and p. Ignaciuk, "MPTCP remote peer control for increasing energy efficiency of downlink transmission," 2016 20th International Conference on System Theory, Control and Computing (ICSTCC), Sinaia, Romania, 2016, pp. 162-167, doi: 10.1109/ICSTCC.2016.7790659. (Year: 2016).*

(Continued)

*Primary Examiner* — Messeret F Gebre

(57)     ABSTRACT

Provided are a network load balancing method and apparatus, an electronic device, a medium, and a program product. After receiving a first packet sent by a client, a virtual switch of the client determines a target flow direction of the first packet according to destination device information in the first packet, determines a packet conversion rule according to verification information carried in the first packet and the target flow direction of the first packet, converts source device information or the destination device information in the first packet on the basis of the packet conversion rule to obtain a second packet, and sends the second packet to a second destination device according to the destination device information in the second packet. Therefore, a substream and a main stream can be directed to the same target server, thereby ensuring normal access.

15 Claims, 7 Drawing Sheets

(56) References Cited

U.S. PATENT DOCUMENTS

| | | | |
|---|---|---|---|
| 2016/0142373 A1* | 5/2016 | Ossipov | H04L 63/126 |
| | | | 713/171 |
| 2019/0068694 A1* | 2/2019 | Ripke | H04L 69/16 |
| 2019/0182363 A1 | 6/2019 | Bonaventure et al. | |
| 2020/0214067 A1 | 7/2020 | Li et al. | |
| 2020/0274819 A1 | 8/2020 | Nahum et al. | |
| 2023/0027642 A1* | 1/2023 | Khanal | H04L 67/1027 |

FOREIGN PATENT DOCUMENTS

| | | |
|---|---|---|
| CN | 109155757 A | 1/2019 |
| CN | 111193773 A | 5/2020 |
| CN | 111512611 A | 8/2020 |
| CN | 112291815 A | 1/2021 |
| CN | 112929264 A | 6/2021 |
| CN | 114285802 A | 4/2022 |
| CN | 114519113 A | 5/2022 |

OTHER PUBLICATIONS

A. Al-Najjar, S. Teed, J. Indulska and M. Portmann, "Flow-based load balancing of web traffic using OpenFlow," 2017 27th International Telecommunication Networks and Applications Conference (ITNAC), Melbourne, VIC, Australia, 2017, pp. 1-6, doi: 10.1109/ATNAC.2017.8215411. (Year: 2017).*

First Office Action dated May 11, 2023 in CN Appl. No. 202111571274.2, English translation (11 pages).

International Search Report dated Dec. 15, 2022 in PCT Appl. No. PCT/US2022/126674, English translation (10 pages).

Office action received from Chinese patent application No. 202111571274.2 mailed on May 11, 2023, 12 pages (6 pages English Translation and 6 pages Original Copy).

* cited by examiner

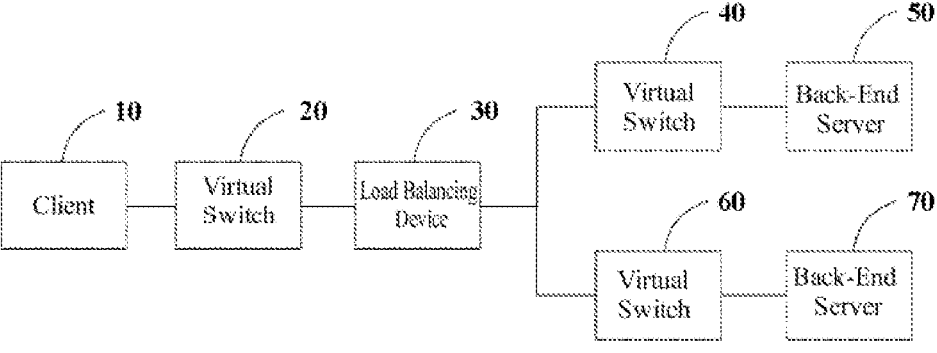

Fig. 1

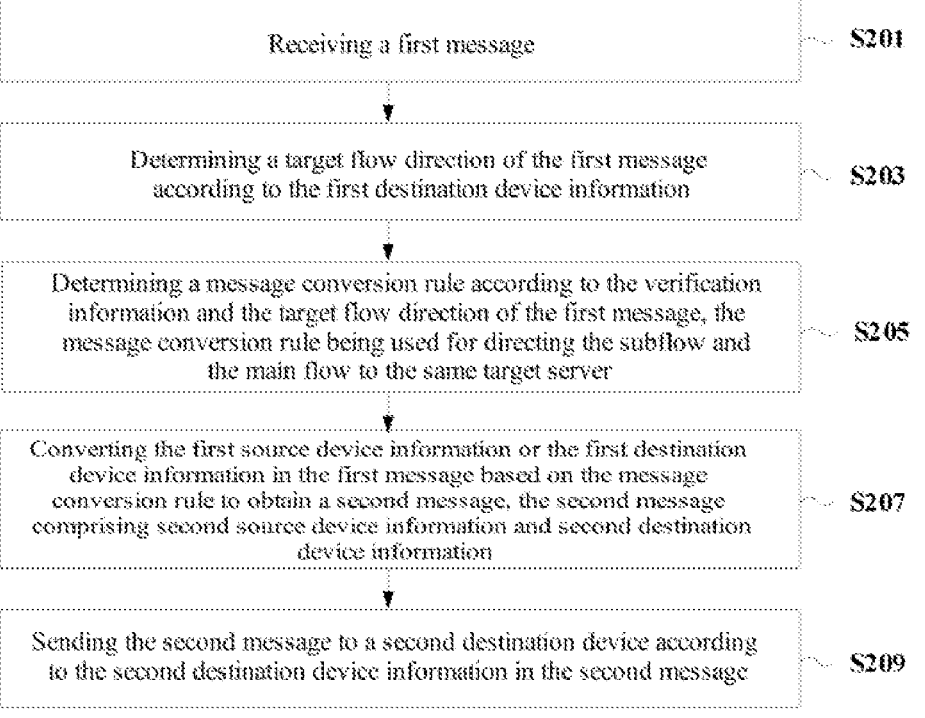

| Receiving a first message | S201 |

| Determining a target flow direction of the first message according to the first destination device information | S203 |

| Determining a message conversion rule according to the verification information and the target flow direction of the first message, the message conversion rule being used for directing the subflow and the main flow to the same target server | S205 |

| Converting the first source device information or the first destination device information in the first message based on the message conversion rule to obtain a second message, the second message comprising second source device information and second destination device information | S207 |

| Sending the second message to a second destination device according to the second destination device information in the second message | S209 |

Fig. 2

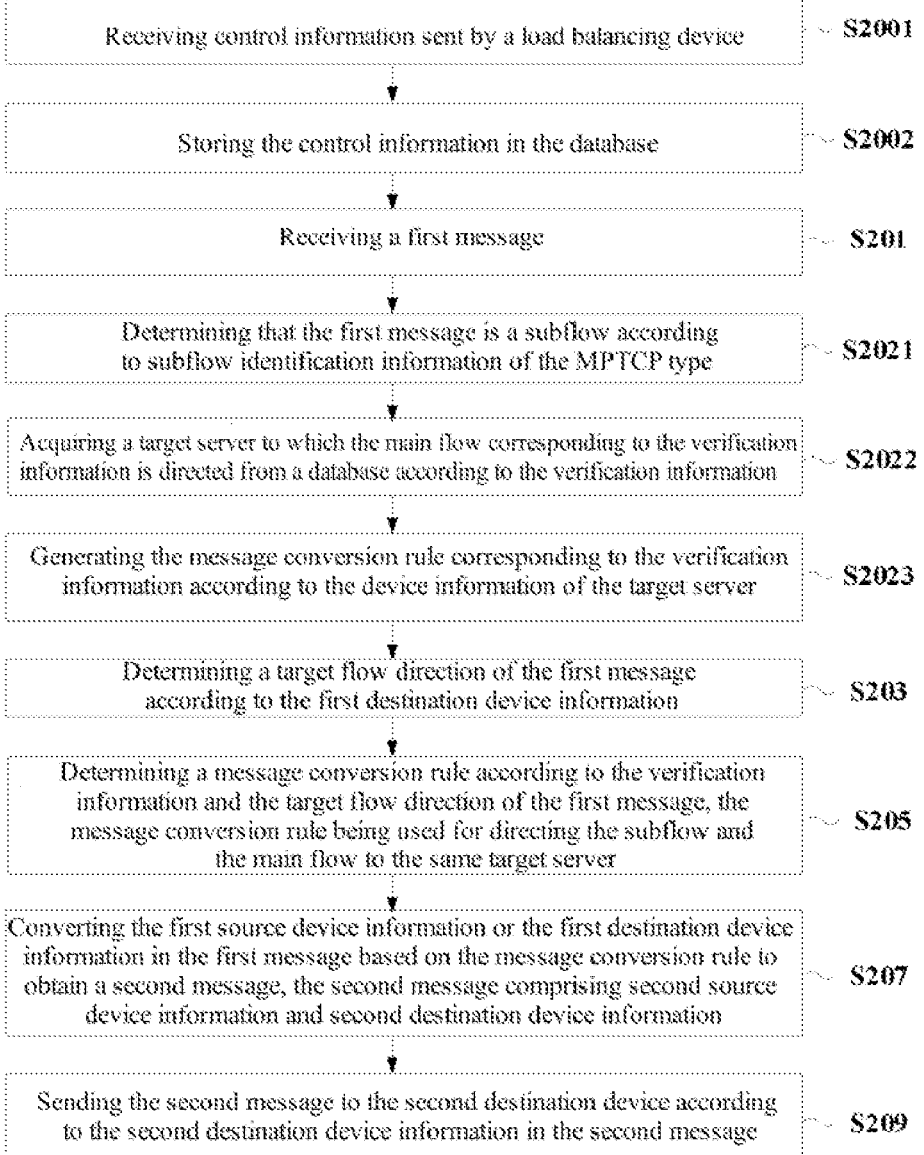

Receiving control information sent by a load balancing device    S2001

Storing the control information in the database    S2002

Receiving a first message    S201

Determining that the first message is a subflow according to subflow identification information of the MPTCP type    S2021

Acquiring a target server to which the main flow corresponding to the verification information is directed from a database according to the verification information    S2022

Generating the message conversion rule corresponding to the verification information according to the device information of the target server    S2023

Determining a target flow direction of the first message according to the first destination device information    S203

Determining a message conversion rule according to the verification information and the target flow direction of the first message, the message conversion rule being used for directing the subflow and the main flow to the same target server    S205

Converting the first source device information or the first destination device information in the first message based on the message conversion rule to obtain a second message, the second message comprising second source device information and second destination device information    S207

Sending the second message to the second destination device according to the second destination device information in the second message    S209

Fig. 4

NETWORK LOAD BALANCING METHOD AND APPARATUS, ELECTRONIC DEVICE, MEDIUM, AND PROGRAM PRODUCT

CROSS-REFERENCE TO RELATED APPLICATIONS

The present application is a national phase application of International Application No. PCT/CN2022/126674, filed on Oct. 21, 2022, which claims priority to Chinese Patent Application No. 202111571274.2, entitled "NETWORK LOAD BALANCING METHOD AND APPARATUS, ELECTRIC DEVICE, MEDIUM, AND PROGRAM PRODUCT", filed on Dec. 21, 2021. The disclosure of both applications is incorporated by reference herein in their entirety.

TECHNICAL FIELD

The present disclosure relates to the field of communication technology, and in particular a network load balancing method and apparatus, an electronic device, a medium, and a program product.

BACKGROUND

The Multi-Path Transmission Control Protocol (briefly referred to as MPTCP) defines a way to establish a connection between two hosts, allowing the connection to use multiple paths simultaneously, wherein the MPTCP creates a sub connection on each path that needs to be used.

In the related art, a network load balancing device determines a target server from a set of servers through a load balancing algorithm and sends a message to the target server.

SUMMARY

The present disclosure provides a network load balancing method and apparatus, an electronic device, a medium and a program product.

A first aspect of the present disclosure provides a network load balancing method, the method comprising:

receiving a first message, the first message comprising: first source device information, first destination device information, subflow identification information of a Multi-Path Transmission Control Protocol (MPTCP) type, and verification information, the verification information being used for indicating a main flow corresponding to a subflow identified by the subflow identification information;

determining a target flow direction of the first message according to the first destination device information;

determining a message conversion rule according to the verification information and the target flow direction of the first message, the message conversion rule being used for directing the subflow and the main flow to a same target server;

converting the first source device information or the first destination device information in the first message based on the message conversion rule to obtain a second message, the second message comprising second source device information and second destination device information;

sending the second message to a second destination device according to the second destination device information in the second message.

In some embodiments, the determining a message conversion rule according to the verification information and the target flow direction of the first message comprises:

if a target flow direction of the first message indicates that the message needs to be sent to a load balancing device, then determining a target server corresponding to the main flow according to the verification information, and determining that the message conversion rule is used for converting the first destination device information in the first message into device information of the target server;

if the target flow direction of the first message indicates that the message needs to be sent to a client, then determining that the message conversion rule is used for converting the first source device information in the first message into device information of the load balancing device.

In some embodiments, before the determining a target flow direction of the first message according to the first destination device information, the method further comprises:

determining that the first message is a subflow according to the subflow identification information of the MPTCP type;

acquiring a target server to which the main flow corresponding to the verification information is directed from a database according to the verification information;

generating the message conversion rule corresponding to the verification information according to the device information of the target server, the message conversion rule comprising: if the target flow direction of the first message indicates that the message needs to be sent to the load balancing device, then converting the first destination device information in the first message into the device information of the target server; if the target flow direction of the first message indicates that the message needs to be sent to the client, then converting the first source device information in the first message into the device information of the load balancing device.

In some embodiments, before the receiving a first message, the method further comprises:

receiving control information sent by a load balancing device, the control information comprising the verification information and the device information of the target server;

storing the control information in the database.

In some embodiments, after the generating the message conversion rule corresponding to the verification information according to the device information of the target server, the method further comprises:

starting a timer, and deleting the message conversion rule after the timer expires.

In some embodiments, the network load balancing method is performed by a virtual switch corresponding to the client.

A second aspect of the present disclosure provides a network load balancing method, the method comprising:

receiving a connection establishment response, the connection establishment response comprising main flow identification information of a Multi-Path Transmission Control Protocol (MPTCP) type, device information of a target server, and a key;

generating verification information according to the key;

generating a control message according to the verification information and the device information of the target server, the control message comprising the verification information and the device information of the target server;

sending the control message to a virtual switch corresponding to a client so that the virtual switch generates a message conversion rule based on the control message to direct a subflow corresponding to a main flow to the target server.

In some embodiments, the network load balancing method is performed by a load balancing device.

A third aspect of the present disclosure provides network load balancing apparatus, the apparatus comprising:

a receiving module for receiving a first message, the first message comprising first source device information, first destination device information, subflow identification information of a Multi-Path Transmission Control Protocol (MPTCP) type, and verification information, the verification information being used for indicating a main flow corresponding to a subflow identified by the subflow identification information;

a processing module for determining a target flow direction of the first message according to the first destination device information; determining a message conversion rule according to the verification information and the target flow direction of the first message, the message conversion rule being used for directing the subflow and the main flow to a same target server; and converting the first source device information or the first destination device information in the first message based on the message conversion rule to obtain a second message, the second message comprising second source device information and second destination device information;

a sending module for sending the second message to a second destination device according to the second destination device information in the second message.

A fourth aspect of the present disclosure provides a network load balancing apparatus, the apparatus comprising:

a receiving module for receiving a connection establishment response, the connection establishment response comprising main flow identification information of a Multi-Path Transmission Control Protocol (MPTCP) type, device information of a target server, and a key;

a processing module for generating verification information according to the key; and generating a control message according to the verification information and the device information of the target server, the control message comprising the verification information and the device information of the target server;

a sending module for sending the control message to a virtual switch corresponding to a client so that the virtual switch generates a message conversion rule based on the control message to direct a subflow corresponding to a main flow to the target server.

A fifth aspect of the present disclosure provides an electronic device, comprising: one or more processors; a memory; and one or more computer programs; wherein the one or more computer programs are stored in the memory; the one or more processors, when executing the one or more computer programs, cause the electronic device to implement the network load balancing method according to any one of the first aspect or the network load balancing method according to the second aspect.

A sixth aspect of the present disclosure provides a computer storage medium, comprising computer instructions which, when being performed on an electronic device, cause the electronic device to perform the network load balancing method according to any one of the first aspect or the network load balancing method according to the second aspect.

A seventh aspect of the present disclosure provides a computer program product which, when being performed on a computer, causes the computer to perform the method according to any one of the first aspect or the network load balancing method according to the second aspect.

An eighth aspect of the present disclosure provides a network load balancing system, comprising: a virtual switch corresponding to a client, configured to perform the network load balancing method according to any one of the first aspect.

In some embodiments, the network load balancing system further comprises: a load balancing device, configured to perform the network load balancing method according to any one of the second aspect.

BRIEF DESCRIPTION OF THE DRAWINGS

The accompanying drawings, which are incorporated in and constitute a part of the present specification, illustrate embodiments consistent with the present disclosure and, together with the specification, serve to explain the principles of the present disclosure.

In order to more clearly illustrate the embodiments of the present disclosure or technical solutions in the related art, the accompanying drawings used in the description of the embodiments or related art will be briefly introduced below, and it is obvious for those skilled in the art to obtain other drawings based on these accompanying drawings without inventive efforts.

FIG. 1 is a schematic architecture diagram of a load balancing system provided in the present disclosure;

FIG. 2 is a schematic flow diagram of an embodiment of a network load balancing method provided in the present disclosure;

FIG. 4 is a schematic flow diagram of an embodiment of another network load balancing method provided in the present disclosure;

DETAILED DESCRIPTION

Figure 3:
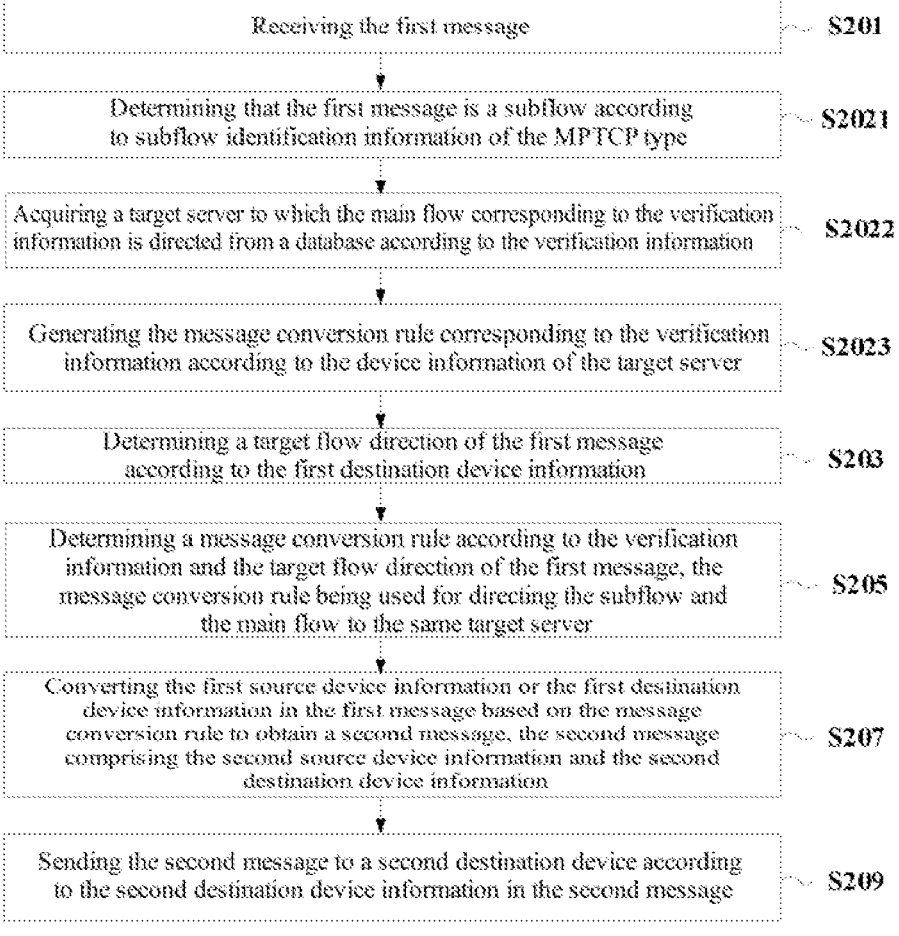
FIG. 3 is a schematic flow diagram of an embodiment of another load balancing method provided in the present disclosure.

In order to enable the above objects, features and advantages of the present disclosure to be more clearly understood, solutions of the present disclosure will be further described below. It should be noted that, in the case of no conflict, the embodiments and features in the embodiments of the present disclosure can be combined with each other.

In the following description, numerous specific details are set forth in order to provide a thorough understanding of the present disclosure, but the present disclosure can also be practiced otherwise than as described herein. Obviously, the embodiments in the specification are only part of embodiments of the present disclosure, and not all embodiments.

In the standard Transmission Control Protocol (TCP), a connection should be established between two Internet Protocol (IP) addresses. Each TCP connection is identified by a quadruple identifying addresses and ports of the source and destination. Because of this limitation, an application can only create one TCP connection over a single connection, and thus, such a situation may occur that, although it is possible for multiple connections to be established simultaneously between two hosts, only a single connection is utilized by a certain application at one time.

The MPTCP defines a way to establish a connection between two hosts, rather than between two interfaces. The MPTCP allows the connection to use multiple paths simultaneously, thereby maximizing channel resource usage. The MPTCP creates a TCP connection of one sub-connection (subflow) on each path that needs to be used.

How the MPTCP connection is established is explained below by taking an example in which a MPTCP connection is established for host A and host B. Assume that host A has two addresses, i.e. address A1 and address A2, respectively, and host B has address B1.

When the MPTCP connection (also referred to as a main connection) between host A and host B is established for the first time, the three-way handshake of TCP is followed. A difference from the three-way handshake of TCP is that each transmitted message segment needs to be added with MPTCP identification information (MP_CAPABLE) and a key. Details are as follows.

Host A sends a data packet (SYN) to address B1 of host B via address A1. The data packet is the same as that sent when the TCP connection is established, except for the addition of the MPTCP identification information (MP_CAPABLE) and a key A generated by host A (key A is used for verification when a sub connection is subsequently established, and thus host A generates a different key each time the MPTCP main connection is established).

Host B sends a data packet (SYN+ACK) to address A1 of host A via address B1, wherein the data packet also contains MPTCP identification information (MP_CAPABLE) and a key B generated by host B.

Host A sends a data packet (ACK) to address B1 of host B via address A1, wherein the data packet contains MPTCP identification information (MP_CAPABLE), key A and key B. At this time, a main connection is established for host A and host B.

Then, if host A needs to establish a connection (referred to as a sub connection) with address B1 of host B via address A2, four handshakes are needed to ensure the security of the connection. Details are as follows.

Host A sends a data packet (SYN) to address B1 of host B via address A, wherein the data packet contains subflow identification information (MP_JOIN), verification information (Token), and a random number A. The Token is a hash value of the key B when the main connection is previously established, and the random number A is generated by host A.

Host B sends a data packet SYN/ACK to address A2 of host A via address B1, wherein the data packet contains subflow identification information (MP_JOIN), verification information (HMAC-B), and a random number B. The HMAC-B is obtained by carrying out a hash operation on random number A and random number B, and random number B is generated by host B.

Host A sends a data packet (ACK) to address B1 of host B via address A2, wherein the data packet contains verification information (HMAC-A). The HMAC-A is obtained by carrying out a hash operation on random number A and random number B.

Host B sends a data packet (ACK) to address A2 of host A via address B1, and at this time, establishment of the sub connection is completed.

Load balancing often needs to be carried out in a data center. The load balancing can be performed by forming a set of servers by multiple servers and distributing requests sent from outside to a certain server in the set of servers through a load sharing technology, and the server which has received the requests responds to the requests of a client independently. The network load balancing solves the problem of serving massive concurrent accesses by distributing the requests of the client to different servers.

The network load balancing is divided into 4-layer 4 load balancing and layer 7 load balancing according to different layers defined in the OSI model where it operates, wherein the layer 4 load balancing can be further divided into TCP, UDP and other types according to the protocols it supports. The TCP type of load balancing is used as load sharing of the TCP type of request.

The MPTCP is used for carrying out load balancing of the data center, which can effectively improve performance of the load balancing.

The system to which the technical solution of the present disclosure is applied is described below with reference to FIG. 1. Referring to FIG. 1, FIG. 1 is a schematic architecture diagram of a load balancing system provided in the present disclosure. The load balancing system can include: a client 10, a virtual switch 20, a load balancing device 30, a virtual switch 40, a server 50, a virtual switch 60, and a server 70. Among them, the virtual switch 20 can be referred to as a virtual switch of the client 10, the virtual switch 40 can be referred to as the virtual switch of the server 50, and the virtual switch 60 can be referred to as the virtual switch of the server 70.

The client 10 can be one or more clients. The client 10 can be connected to one or more load balancing devices through the virtual switch 20. One load balancing device 30 is exemplarily shown in FIG. 1.

The load balancing device 30 can be connected to a plurality of servers, each of which is connected to the load balancing device 30 through a virtual switch. Two servers are exemplarily shown in FIG. 1, i.e. the server 50 and the server 70, respectively. The server 50 is connected to the load balancing device 30 through the virtual switch 40, and the server 70 is connected to the load balancing device 30 through the virtual switch 60.

One application scene of the present disclosure is described below in conjunction with the system shown in FIG. 1. The client 10 being a mobile phone is taken as an example. The mobile phone can include two Internet access ways, namely, a cellular mobile data network (including a 2G, 3G, 4G, or 5G network, etc.) and a WIFI network. A user desires to use WIFI as much as possible when the WIFI is available, thus saving the cost, and to automatically switch to a cellular mobile network when the WIFI is absent, thus avoiding disconnection. For this purpose, the MPTCP connection can be established between the mobile phone and the server, and the mobile phone can establish a MPTCP main connection with the server through the WIFI network and then establish a MPTCP sub connection with the same server through the cellular mobile data network.

In a load balancing scene, the client 10 is actually facing the load balancing device 30. In the related art, when the client 10 needs to access a certain service, a MPTCP main connection establishment request is sent by the virtual switch 20 to the load balancing device 30. The load balancing device 30 will take the request as a request for establishing a TCP connection. According to the load balancing scheduling algorithm, a server is selected from the server 50 and the server 70. Assuming that the server 50 is selected, a connection is established between the server 50 and the client 10, and a main connection is established successfully.

However, when the client 10 needs to establish a MPTCP sub connection, a MPTCP connection establishment request is sent to the load balancing device 30 via the virtual switch 20. The load balancing device 30 will still take the request as a request for establishing a TCP connection. The load balancing device 30 will proceed as if it is a new TCP connection, and select one server from the server 50 and the server 70. It is possible for the load balancing device 30 to select the server 70, which will thus result in that access cannot be made.

However, in an application scene of MPTCP, the MPTCP messages of the same host need to be sent to the same target server. However, sending the MPTCP messages of the same host to the same target server cannot be realized in a communication way in the related art, which thus results in abnormal access.

In order to solve the above technical problem, the present disclosure provides a network load balancing method. In the present disclosure, after determining that a message is a subflow according to subflow identification information contained in the message, a virtual switch corresponding to a client determines a main flow corresponding to the subflow according to verification information in the message, and directs the subflow to a same target server as the main flow based on device information of the target server corresponding to the main flow acquired from a load balancing device, so as to direct the subflow and the main flow to the same target server, which ensures access to be properly carried out.

The technical solution of the present disclosure will be described below with reference to specific embodiments.

FIG. 2 is a schematic flow diagram of an embodiment of a network load balancing method provided in the present disclosure. As shown in FIG. 2, the method of the present embodiment is performed by a virtual switch corresponding to a client. The method of the present embodiment is as follows:

S201: a first message is received.

A first message includes: first source device information, first destination device information, subflow identification information of a MPTCP type, and verification information.

The verification information is used for indicating a main flow corresponding to a subflow identified by the subflow identification information.

In some embodiments, the first source device information can include a source address and a source port number. The first destination device information can include a destination address and a destination port number. The subflow identification information of the MPTCP type is used for identifying that the first message is a subflow of the MPTCP type. The subflow identification information can be, for example, the above-mentioned MP_JOIN, and it can be determined that the message is a subflow according to the subflow identification information. The verification information can uniquely identify a main flow, for example, it can be the above-mentioned Token. Thus, the main flow corresponding to the subflow can be determined according to the verification information.

In some embodiments, the first message received by the virtual switch corresponding to the client might come from the client or from the target server.

In some embodiments, the first message can be a message for establishing a connection, or a message for carrying out data transmission. Both can apply the technical solution of the present disclosure.

S203, a target flow direction of the first message is determined according to the first target device information.

The target flow direction of the first message can be determined according to the first destination device information carried in the first message, which includes the following two cases:

If the first destination device information of the first message is device information of a load balancing device, then it means that the first message needs to be sent to the load balancing device, that is, the target flow direction of the first message is to be sent to the load balancing device. A target flow direction of being sent to the load balancing device can also be described as an outgoing direction in the present disclosure.

If the first destination device information of the first message is device information of a client, then it means that the first message needs to be sent to the client, that is, the target flow direction of the first message is to be sent to the client. The target flow direction of being sent to the client can also be described as an incoming direction or an inward direction in the present disclosure, and the present disclosure makes no limitations hereto.

S205, a message conversion rule is determined according to the verification information and the target flow direction of the first message, the message conversion rule being used for directing the subflow and the main flow to the same target server.

Because the verification information can uniquely identify the main flow, the main flow corresponding to the subflow can be determined according to the verification information carried in the subflow, and the message conversion rule corresponding to the main flow can be obtained. The message conversion rule corresponding to the main flow includes message conversion rules of two flow directions (the above-mentioned outgoing direction and incoming direction). Therefore, the message conversion rule to be adopted by the first message can be determined based on the target flow direction of the first message, and the subflow and the main flow can be directed to the same target server through the message conversion rule.

S207, the first source device information or the first destination device information in the first message is converted based on the message conversion rule to obtain a second message, the second message including second source device information and second destination device information.

Specifically, one case is that, if the target flow direction of the first message indicates that the message needs to be sent to a load balancing device, then a target server corresponding to the main flow is determined according to the verification information, and the message conversion rule is determined as being used for converting the first destination device information in the first message into the device information of the target server. That is, by replacing the destination address in the first message from the device information of the load balancing device to the device information of the target server corresponding to the main flow, the subflow and the main flow can be directed to the same target server.

Another case is that, if the target flow direction of the first message indicating that the message needs to be sent to a client, the message conversion rule is determined as being used for converting the first source device information in the first message into the device information of the load balancing device, that is, by converting the source address in the first message from the device information of the target server into the device information of the load balancing device.

S209, the second message is sent to a second destination device according to the second destination device information in the second message.

If the first message needs to be sent to the load balancing device, it can be directly sent to the target server corresponding to the main flow according to the operation of S207, which ensures the subflow and the main flow to be directed to the same target server. Furthermore, in this process, there is no need to pass through the load balancing device, which reduces the load of the load balancing device.

If the first message needs to be sent to the client, by changing the device information of the target server to the device information of the load balancing device, the client can be ensured to normally parse the message.

In the present embodiment, after receiving a first message sent by a client, a virtual switch of the client determines a target flow direction of the first message according to the destination device information in the first message, determines a message conversion rule based on verification information carried in the first message and the target flow direction of the first message, converts source device information or destination device information in the first message based on the message conversion rule to obtain a second message, and sends the second message to a second destination device according to destination device information in the second message. Since the message contains the verification information and the subflow identification information of a MPTCP type, it can be determined that the first message is a subflow according to the subflow identification information, the verification information can indicate a main flow corresponding to the subflow identified by the subflow identification information, and the message conversion rule can direct the subflow and the main flow to the same target server, which thus causes the subflow and the main flow to be directed to the same target server and ensures access to be carried out normally. Furthermore, in this process, the subflow has no need to pass through the load balancing device, which reduces the load of the load balancing device and improves the system capacity.

FIG. 3 is a schematic flow diagram of an embodiment of another load balancing method provided in the present disclosure. On the basis of the embodiment shown in FIG. 2, FIG. 3 further includes, before S203, the following steps:

S2021, it is determined that the first message is a subflow according to subflow identification information of the MPTCP type.

That is, if the message is found to contain the subflow identification information of the MPTCP type after the message is parsed, it is determined that the first message is a subflow.

S2022, a target server to which the main flow corresponding to the verification information is directed is acquired from a database according to the verification information.

Since the verification information can uniquely identify one main flow and the database records a target server corresponding to the main flow, the target server to which the main flow corresponding to the verification information is directed can be acquired from the database based on the verification information.

S2023, the message conversion rule corresponding to the verification information is generated according to device information of the target server.

The message conversion rule includes: if a target flow direction of the first message indicates that the message needs to be sent to the load balancing device, then converting first destination device information in the first message into the device information of the target server; if a target flow direction of the first message indicates that the message needs to be sent to a client, then converting first source device information in the first message into device information of the load balancing device.

In the present embodiment, by determining that the first message is a subflow according to the subflow identification information of the MPTCP type, then acquiring the target server to which the main flow corresponding to the verification information is directed from a database according to the verification information, and generating the message conversion rule corresponding to the verification information based on the device information of the target server, the subflow and the main flow can be directed to the same target server based on the message conversion rule in the subsequent process of message transmission, which ensures access to be normally carried out.

On the basis of the above embodiment, after generating the message conversion rule, the method further comprises: starting a timer, and deleting the message conversion rule when the timer expires.

FIG. 4 is a schematic flow diagram of an embodiment of another network load balancing method provided in the present disclosure. On the basis of the embodiment shown in FIG. 3, FIG. 4 further includes the following steps:

S2001, control information sent by the load balancing device is received.

The control information includes the verification information and device information of the target server.

Specifically, one possible implementation is as follows.

In the process of establishing the main connection, the load balancing device receives a connection establishment response sent by the target server. The connection establishment response includes: main flow identification information of the MPTCP type, device information of the target server, and a key. The load balancing device generates verification information according to the key; generates a control message according to the verification information and the device information of the target server, the control message including the verification information and the device information of the target server; and sends the control message to a virtual switch corresponding to the client, so that the virtual switch generates a message conversion rule based on the control message to direct the subflow corresponding to the main flow to the same target server.

S2002, the control information is stored in the database.

After receiving the control information, the virtual switch corresponding to the client stores the control information in the database for use in generating a message conversion rule based on the message control information after receiving the subflow.

In the present embodiment, by receiving the control information sent by the load balancing device and storing the control information in the database, the control information containing the verification information and the device information of the target server, the virtual switch corresponding to the client can generate a message conversion rule based on the control message, so as to direct the subflow corresponding to the main flow to the same target server, which ensures access to be normally carried out.

The technical solution of the present disclosure is described with reference to a few specific examples.

Figure 5:
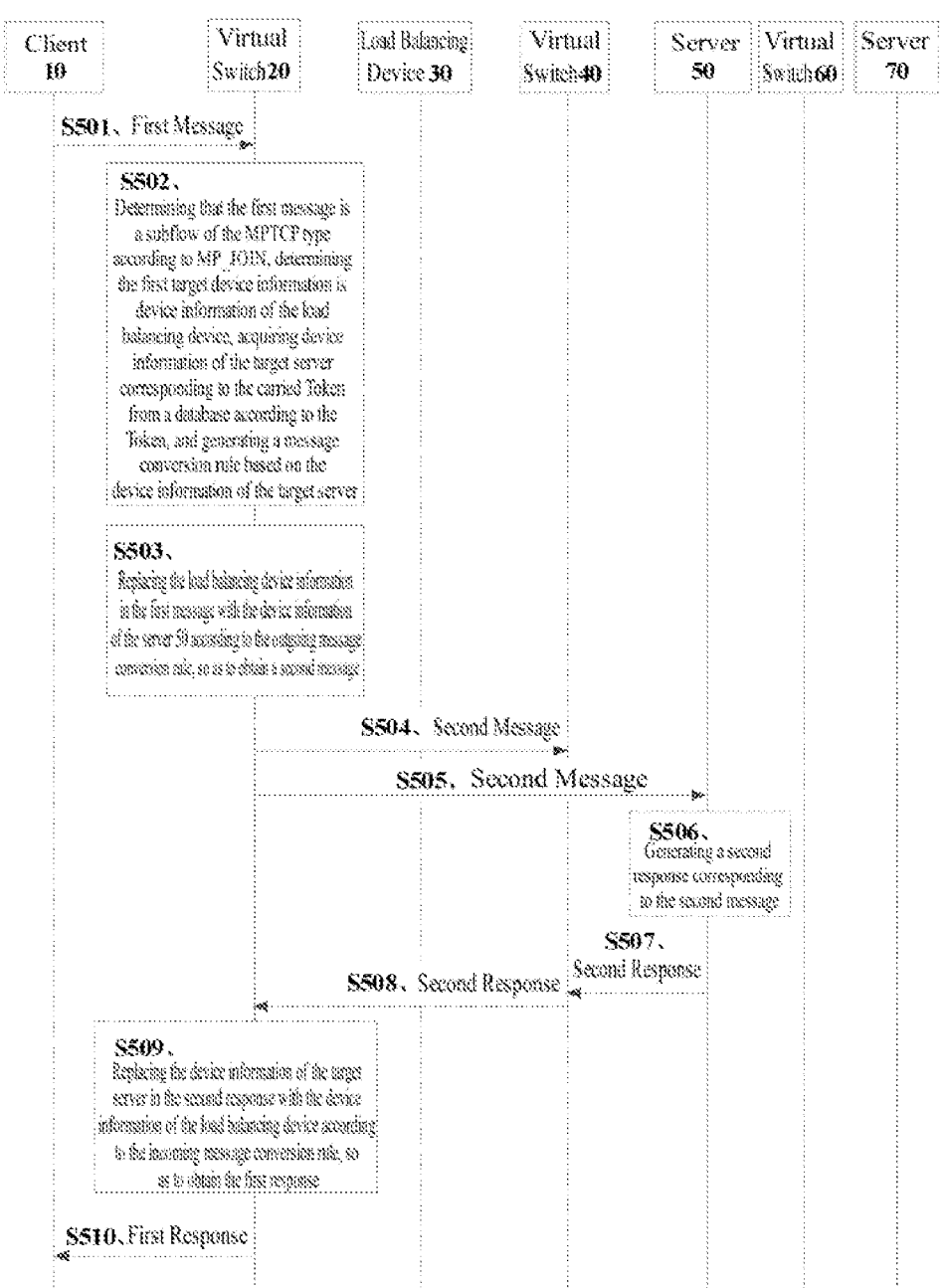
FIG. 5 is a schematic flow diagram of an embodiment of another load balancing method provided in the present disclosure.

FIG. 5 is a schematic flow diagram of an embodiment of another load balancing method provided in the present disclosure. As shown in FIG. 5, the present embodiment includes: a client 10, a virtual switch 20, a load balancing device 30, a virtual switch 40, a server 50, a virtual switch 60, and a server 70. Among them, the virtual switch 20 is a virtual switch of the client 10, the virtual switch 40 is a virtual switch of the server 50, and the virtual switch 60 may be a virtual switch of server 70.

S501, the client 10 sends a first message to the virtual switch 20.

The first message contains a TCP connection from IP address 1 and port number 1 of the client 10 to IP address 2 and port number 2 of the load balancing device 30, a MP_JOIN, and a token.

The MP_JOIN corresponds to the subflow identification information of the MPTCP type, the token is the verification information, and the IP address 2 and the port number 2 of the load balancing device 30 correspond to the first destination device information.

S502, the virtual switch 20 determines that the first message is a subflow of the MPTCP type according to the MP_JOIN, determines the first target device information is the device information of the load balancing device, acquires device information of the target server corresponding to the Token in a database according to the carried Token, and generates a message conversion rule based on the device information of the target server.

By querying the database, the target server corresponding to the token can be acquired as the server 50, as well as the device information of the server 50, namely the IP address 3 and the port 3.

The message conversion rule includes: an outgoing message conversion rule and an incoming message conversion rule.

The outgoing message conversion rule includes: replacing the destination address and the port number in the message with the address and the port number of the target server corresponding to the main flow.

The incoming message conversion rules includes: replacing the source address and the source port number in the message with the address and the port number of the load balancing device.

S503, the load balancing device information in the first message is replaced with the device information of the server 50 according to the outgoing message conversion rule, so as to obtain a second message.

The second message includes: source device information (IP address 1 and port number 1 of the client 10); destination device information (IP address 3 and port number 3 of the server 50), subflow identification information (MP_JOIN), and verification information (token).

S504, the virtual switch 20 sends the second message to the virtual switch 40 corresponding to the target server.

In some embodiments, in step S503, the first message can also be subjected to overlay packaging, for example, a User Datagram Protocol (UDP) can be used to encapsulate a TCP data packet, so as to obtain a second message. The inner layer in the second message includes: a TCP connection from IP address 1 and port number 1 of the client 10 to IP address 3 and port number 3 of the server 50, MP_JOIN, and the token.

Accordingly, in step S504, the second message sent by the virtual switch 20 to the virtual switch 40 is the second message after being subjected to overlay packaging.

S505, the virtual switch 20 sends the second message to the server 50.

On the basis of the embodiment shown in FIG. 5, after step S505, the method provided in the present embodiment can further include the following steps.

S506, the server 50 generates a second response corresponding to the second message.

The second response includes a response to the TCP connection from IP address 3 and port number 3 of the server 50 to IP address 1 and port number 1 of the client 10, MP_JOIN, and HMAC.

S507, the server 50 sends a second response to the virtual switch 40.

The second response includes a response to the TCP connection response from IP address 3 and port number 3 of server 50 to IP address 1 and port number 1 of the client 10, MP_JOIN, and HMAC.

S508, the virtual switch 40 sends a second response to the virtual switch 20.

In some embodiments, before step S508, the second response can also be subjected to overlay packaging, for example, a User Datagram Protocol (UDP) can be used to encapsulate a TCP data packet, so as to obtain the second response. An inner layer in the updated second response contains the response to the TCP connection from IP address 3 and port number 3 of the server 50 to IP address 1 and port number 1 of the client 10, MP_JOIN, and HMAC.

Accordingly, in step S508, the first connection establishment response sent by the virtual switch 40 to the virtual switch 20 is the second response having been subjected to overlay packaging.

S509, the virtual switch 20 replaces the device information of the target server in the second response with the device information of the load balancing device according to the incoming message conversion rule, so as to obtain the first response.

That is, the IP address 3 and the port number 3 of the server 50 in the second response are updated to the IP address 2 and the port number 2 of the load balancing device 30, so as to obtain the first response.

The first response includes: source device information (IP address 2 of the load balancing device 30); destination device information (port number 2 to IP address 1 and port number 1 of the client 10), subflow identification of MPTCP (MP_JOIN), and HMAC.

S510, the virtual switch 20 sends a first response to the client 10.

Through the above process, the subflow and the main flow are directed to the same target server, which ensures access to be normally carried out. Furthermore, the load balancing device has no need to participate in this process, which reduces the load of the load balancing device and improves the system capacity.

Figure 6:
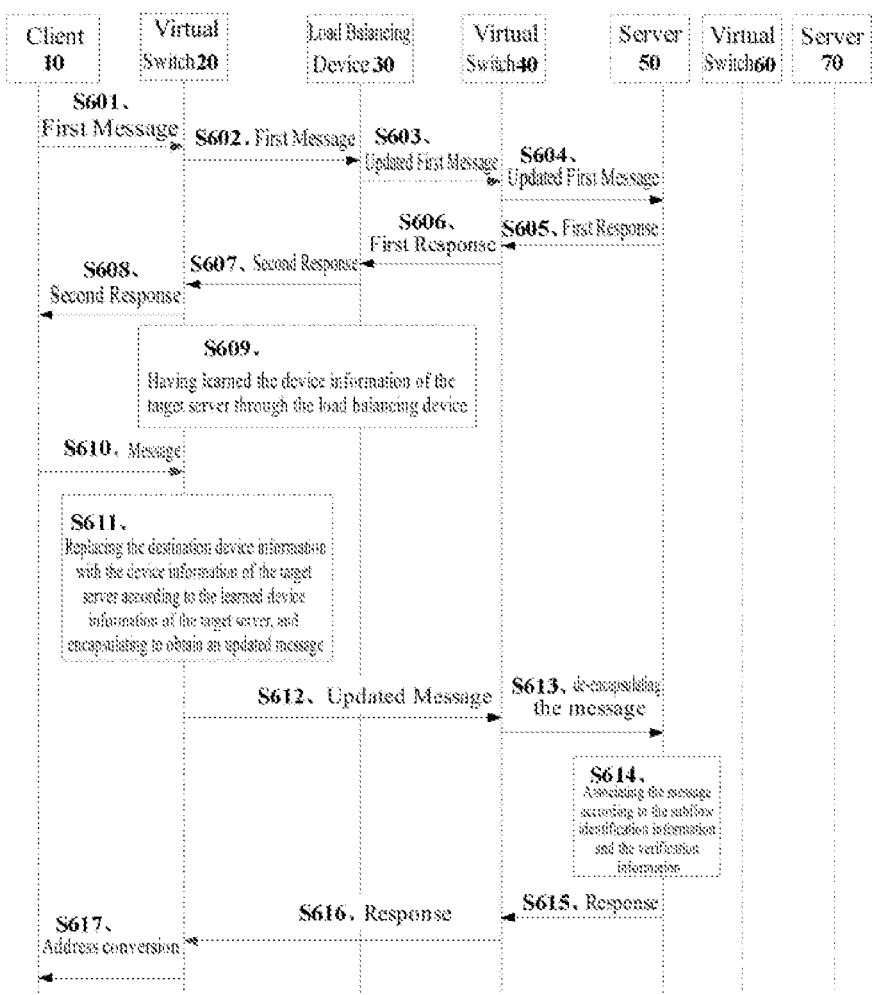
FIG. 6 is a schematic flow diagram of an embodiment of another load balancing method provided in the present disclosure.

A process in which the virtual client corresponding to the client obtains the device information of the target server corresponding to the main flow and stores it in the database is described below, as shown in FIG. 6.

S601: the client 10 sends the first message to the virtual switch 20.

The first message contains: source device information (IP address 4 and port number 4 of the client 10); destination device information (IP address 2 and port number 2 of the load identification information balancing apparatus 30), main flow identification information of the MPTCP type (MP_CAPABLE), and a key (key 1).

S602, the virtual switch 20 sends the first message to the load balancing device 30.

The virtual switch 20 encapsulates the first message and then sends it to the load balancing device.

S603, the load balancing device 30 sends the updated first message to the virtual switch 40.

The load balancing device 30 selects the target server according to the load balancing policy. Assuming that the server 50 is selected, the IP address 2 and the port number 2 of the load balancing device 30 are replaced with the IP address 3 and the port number 3 of the server 50.

The load balancing device 30 sends the updated first message to the virtual switch 40.

S604, the virtual switch 40 sends the updated first message to the server 50.

S605, the server 50 sends the first response to the virtual switch 40.

The first response contains: source device information (IP address 3 and port number 3 of the server 50); destination device information (IP address 4 and port number 4 of the client 10), main flow identification information of the MPTCP type (MP_CAPABLE), and a key (key 2).

S606, the virtual switch 40 sends the first response to the load balancing device 30.

The first response contains: a TCP connection from a source address (IP address 3 and port number 3 of the server 50) to IP address 4 and port number 4 of the client 10, main flow identification information of the MPTCP type (MP_CAPABLE), and key 2.

S607, the load balancing apparatus 30 sends a second response to the virtual switch 20.

The load balancing device converts the source device information in the first response and encapsulates the first response to obtain a second response.

The load balancing device 30 updates the IP address 3 and the port number 3 of the server 50 in the first response to the IP address 2 and the port number 2 of the load balancing device 30, so as to obtain a second response.

The second response includes: device information (IP address 2 and port number 2 of the load balancing device 30), destination device information (IP address 4 and port number 4 of the client 10), main flow identification information of the MPTCP type (MP_CAPABLE), and key 2.

S608, the virtual switch 20 sends the second response to the client 10.

After S606, the method further includes:

s609, the virtual switch 20 of the client has learned the device information of the target server through the load balancing device.

S610, the client 10 sends a message to the virtual switch 20.

The message includes: source device information, destination device information, subflow identification information of the MPTCP type, and verification information.

They are source device information (IP address 4 and port number 4 of the client 10), destination device information (IP address 2 and port number 2 of the load balancing apparatus 30), main flow identification information of the MPTCP type (MP_JOIN), and verification information (Token).

S611, the virtual switch 20 replaces the destination device information with the device information of the target server according to the learned device information of the target server, and encapsulates the device information of the target server to obtain an updated message.

The updated message includes: source device information, destination device information, subflow identification information of the MPTCP type, and verification information.

They are source device information (IP address 4 and port number 4 of the client 10), destination device information (IP address 3 and port number 3 of the server 50), subflow identification information (MP_JOIN), and verification information (token).

S612, the virtual switch 20 sends the updated message to the virtual switch 40.

S613, the virtual switch 40 de-encapsulates the message and sends it to the server 50.

S614, after receiving the message, the server 50 associates the message according to the subflow identification information and the verification information.

S615, the server 50 sends a response to the virtual switch 40.

The response includes: source device information, destination device information, subflow identification information of the MPTCP type, and HMAC of the virtual switch 40.

S616, the virtual switch 40 sends a response to the virtual switch 20 of the client.

The virtual switch 40 encapsulates the response and sends it to the virtual switch 20.

S617, the virtual switch 20 carries out address conversion and sends a response to the client 10.

That is, the IP address 3 and the port number 3 of the server 50 in the response are updated with the IP address 2 and the port number 2 of the load balancing device 30 to obtain the updated response.

The updated response contains: source device information (IP address 2 of load balancing device 30), destination device information (port number 2 to IP address 1 and port number 1 of the client 10), subflow identification of MPTCP (MP_JOIN), and HMAC.

In the present embodiment, in the process of establishing the main flow, the virtual machine of the client has learned the device information of the target server through the load balancing device, so that after receiving the subflow, the virtual switch corresponding to the client can direct the subflow and the main flow to the same target server according to the stored control information.

Figure 7:
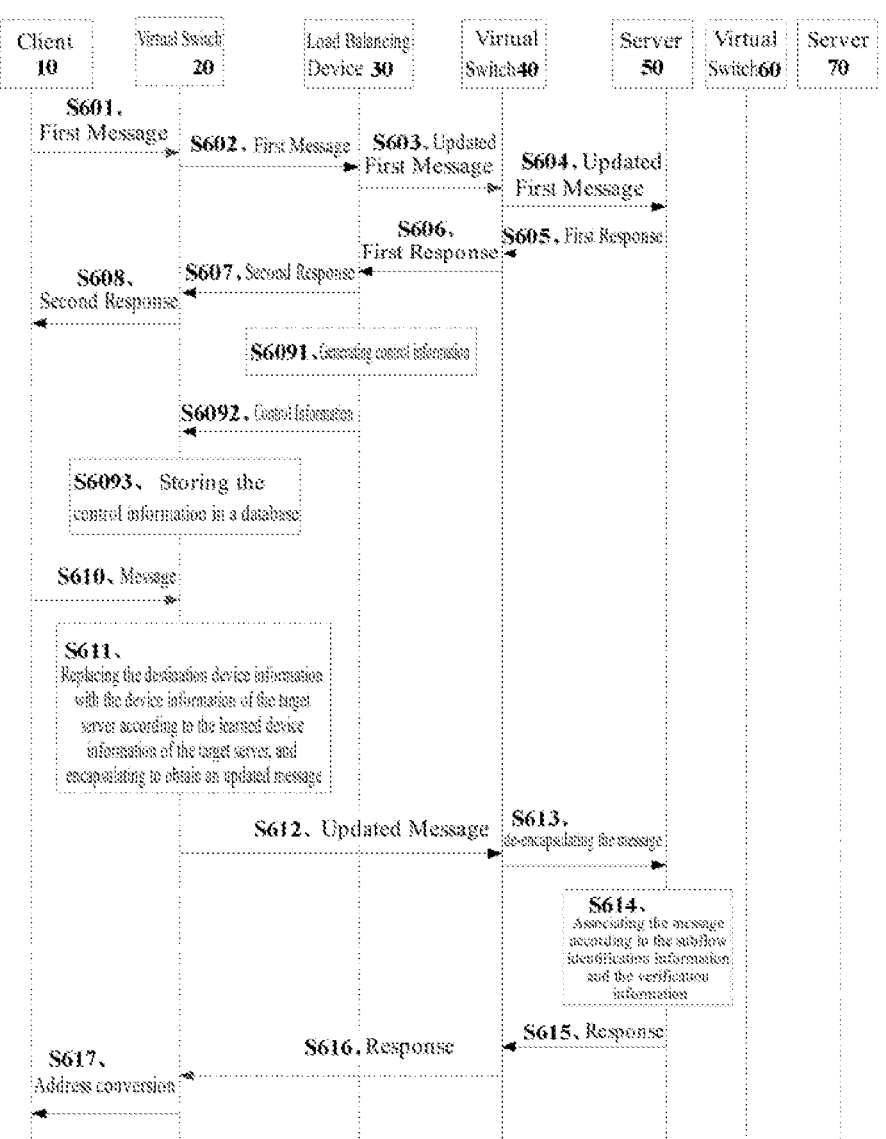
FIG. 7 is a schematic flow diagram of an embodiment of another load balancing method provided in the present disclosure.

On the basis of the embodiment shown in FIG. 6, an implementation of S609 is shown in FIG. 7, including:

S6091, the load balancing device 30 generates control information.

The load balancing device determines that the client attempts to establish a MPTCP session with the server according to the main flow identification information of the MPTCP type in the first response, calculates verification information Token according to key 2 carried in the message replied by the virtual switch 40, where the Token can uniquely identify the session, and generates control information according to device information of the server 50 and the calculated verification information.

S6092, the load balancing device 30 sends the control information to the virtual switch 20.

S6093, the virtual switch 20 stores the control information in a database.

By the above-mentioned method, in the process of establishing the main flow, the load balancing device has learned the device information of the target server, generates the control information based on the device information of the target server and the obtained verification information, and sends the control information to virtual switch the corresponding to the client, so that after receiving the subflow, the virtual switch corresponding to the client can direct the subflow and the main flow to the same target server according to the stored control information.

Figure 8:
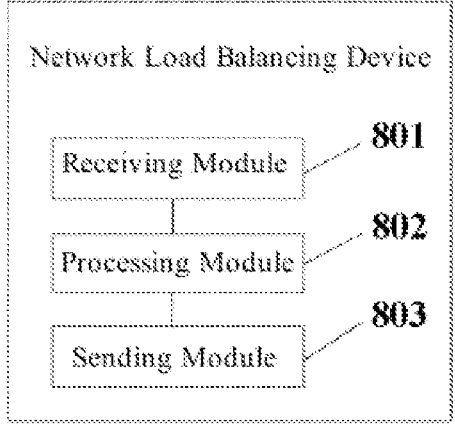
FIG. 8 is a schematic structural diagram of a network load balancing apparatus provided in the present disclosure.

FIG. 8 is a schematic structural diagram of a network load balancing apparatus provided in the present disclosure. As shown in FIG. 8, the apparatus of the present embodiment includes: a receiving module 801, a processing module 802 and a sending module 803.

The receiving module 801 is used for receiving the first message, the first message including first source device information, first destination device information, subflow identification information of a Multi-Path Transmission Control Protocol (MPTCP) type, and verification information, the verification information being used for indicating a main flow corresponding to the subflow identified by the subflow identification information;

The processing module 802 is used for determining a target flow direction of the first message according to the first destination device information; determining a message conversion rule according to the verification information and the target flow direction of the first message, the message conversion rule being used for directing the subflow and the main flow to a same target server; and converting the first source device information or the first destination device information in the first message based on the message conversion rule to obtain a second message, the second message including second source device information and second destination device information;

The sending module 803 is used for sending the second message to a second destination device according to the second destination device information in the second message.

In some embodiments, the processing module 802 is specifically used for determining, if a target flow direction of the first message indicates that the message needs to be sent to a load balancing device, a target server corresponding to the main flow according to the verification information, and determining that the message conversion rule is used for converting the first destination device information in the first message into device information of the target server; and determining, if the target flow direction of the first message indicates that the message needs to be sent to a client, that the message conversion rule is used for converting the first source device information in the first message into the device information of the load balancing device.

In some embodiments, the processing module 802 is further used for determining that the first message is a subflow according to the subflow identification information of the MPTCP type; acquiring a target server to which the main flow corresponding to the verification information is directed from a database according to the verification information; generating the message conversion rule corresponding to the verification information according to the device information of the target server, the message conversion rule including: if the target flow direction of the first message indicates that the message needs to be sent to a load balancing device, then converting first destination device information in the first message into device information of the target server; and if the target flow direction of the first message indicates that the message needs to be sent to a client, then converting first source device information in the first message into device information of the load balancing device.

In some embodiments, the receiving module 801 is further used for receiving control information sent by a load balancing device, the control information including the verification information and the device information of the target server.

The processing module 802 is further used for storing the control information in the database.

In some embodiments, the processing module 802 is further used for starting a timer, and deleting the message conversion rule after the timer expires.

The apparatus of the present embodiment is accordingly used for performing the steps executed by the virtual switch corresponding to the client in the respective foregoing method embodiment. It has the similar implementation principle and technical effect, which are not described herein again.

Figure 9:
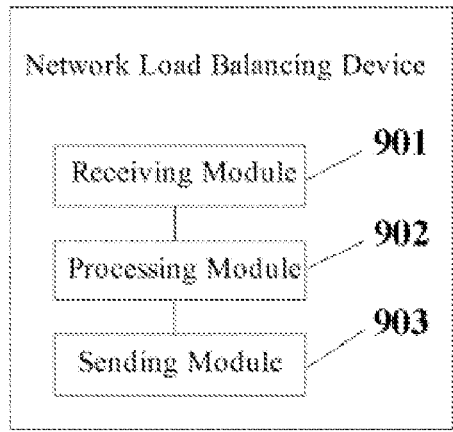
FIG. 9 is a schematic structural diagram of another network load balancing apparatus provided in the present disclosure.

FIG. 9 is a schematic structural diagram of another network load balancing apparatus provided in the present disclosure. As shown in FIG. 9, the apparatus of the present embodiment includes: a receiving module 901, a processing module 902, and a sending module 903.

The receiving module 901 is used for receiving a connection establishment response, the connection establishment response including main flow identification information of a Multi-Path Transmission Control Protocol (MPTCP) type, device information of a target server, and a key.

The processing module 902 is used for generating verification information according to the key; and generating a control message according to the verification information and the device information of the target server, the control message including the verification and information the device information of the target server.

The sending module 903 is used for sending the control message to a virtual switch corresponding to a client so that the virtual switch generates a message conversion rule based on the control message to direct a subflow corresponding to a main flow to the target server.

The apparatus of the present embodiment is accordingly used for performing the steps executed by the load balancing device in the respective foregoing method embodiment. It has the similar implementation principle and technical effect, which are not described herein again.

An embodiment of the present disclosure provides an electronic device, comprising: one or more processors; a memory; and one or more computer programs; wherein the one or more computer programs are stored in the memory; the one or more processors, when executing the one or more computer programs, cause the electronic device to implement the above-mentioned method.

An embodiment of the present disclosure provides a computer storage medium comprising computer instructions which, when being performed on an electronic device, cause the electronic device to perform the above-mentioned method.

An embodiment of the present disclosure provides a computer program product which, when being performed on a computer, causes the computer to perform the above-mentioned method.

The apparatus in the above-mentioned embodiment can be used for implementing the technical solution in the foregoing method embodiment. It has the similar implementation principle and technical effect, which are not described herein again.

It should be noted that, in this document, relational terms such as "first", "second" and the like, are merely used to distinguish one entity or action from another entity or action without necessarily requiring or implying presence of any such actual relationship or order between such entities or actions. Also, the terms "include", "contain" or any other variation thereof, are intended to cover a non-exclusive inclusion, such that a process, method, article, or device including a series of elements includes not only those elements but also other elements not expressly listed or elements inherent to such process, method, article, or device. Without further limitation, an element defined by the phrase "comprising a/an . . . " does not exclude the presence of other identical elements in the process, method, article, or device including the elements.

The above are merely specific implementations of the present disclosure, which will enable those skilled in the art to understand or implement the present disclosure. Various modifications to these embodiments will be obvious for those skilled in the art, and the general principles defined herein can be implemented in other embodiments without departing from the spirit or scope of the present disclosure. Thus, the present disclosure is not intended to be limited to these embodiments shown herein but is to be accorded the widest scope consistent with the principles and novel features disclosed herein.

What is claimed is:

1. A network load balancing method performed by a virtual switch corresponding to a client, comprising:
receiving a first message, the first message comprising: first source device information, first destination device information, subflow identification information of a Multi-Path Transmission Control Protocol (MPTCP) type, and verification information, the verification information being used for indicating a main flow corresponding to a subflow identified by the subflow identification information, wherein the first destination device information of the first message is device information of the client or a load balancing device;
determining a target flow direction of the first message according to the first destination device information;
determining a message conversion rule according to the verification information and the target flow direction of the first message, comprising:
the message conversion rule being used for directing the subflow and the main flow to a same target server;
converting the first source device information or the first destination device information in the first message based on the message conversion rule to obtain a second message, the second message comprising second source device information and second destination device information;
sending the second message to a second destination device according to the second destination device information in the second message without passing through the load balancing device,
wherein the determining a message conversion rule according to the verification information and the target flow direction of the first message comprises:
if the target flow direction of the first message indicates that the message is to be sent to the load balancing device, then determining a target server corresponding to the main flow according to the verification information, and determining that the message conversion rule is used for converting the first destination device information in the first message from device information of the load balancing device into device information of the target server; and
if the target flow direction of the first message indicates that the message is to be sent to a client, then determining that the message conversion rule is used for converting the first source device information in the first message from the device information of the target sever into the device information of the load balancing device.

2. The network load balancing method according to claim 1, wherein, before the determining a target flow direction of the first message according to the first destination device information, the network load balancing method further comprising:
determining that the first message is a subflow according to the subflow identification information of the MPTCP type;
acquiring a target server to which the main flow corresponding to the verification information is directed from a database according to the verification information;
generating the message conversion rule corresponding to the verification information according to the device information of the target server, the message conversion rule comprising: if the target flow direction of the first message indicates that the message needs to be sent to the load balancing device, then converting the first destination device information in the first message into the device information of the target server; if the target flow direction of the first message indicates that the message needs to be sent to the client, then converting the first source device information in the first message into the device information of the load balancing device.

3. The network load balancing method according to claim 2, wherein, before receiving a first message, the network load balancing method further comprising:
receiving control information sent by the load balancing device, the control information comprising the verification information and the device information of the target server;
storing the control information in the database.

4. The network load balancing method according to claim 2, wherein, after the generating the message conversion rule corresponding to the verification information according to the device information of the target server, the network load balancing method further comprising:
starting a timer, and deleting the message conversion rule after the timer expires.

5. An electronic device, comprising: one or more processors; a memory; and one or more computer programs; wherein the one or more computer programs are stored in the memory; wherein the one or more processors, when executing the one or more computer programs, cause the electronic device to implement the network load balancing method according to claim 2.

6. An electronic device, comprising: one or more processors; a memory; and one or more computer programs; wherein the one or more computer programs are stored in the memory; wherein the one or more processors, when executing the one or more computer programs, cause the electronic device to implement the network load balancing method according to claim 1.

7. A non-transitory computer storage medium, comprising computer instructions which, when being performed on an electronic device, cause the electronic device to perform the network load balancing method according to claim 1.

8. A network load balancing method performed by a load balancing device, comprising:
receiving a connection establishment response, the connection establishment response comprising main flow identification information of a Multi-Path Transmission Control Protocol (MPTCP) type, device information of a target server, and a key;

generating verification information according to the key;

generating a control message according to the verification information and the device information of the target server, the control message comprising the verification information and the device information of the target server;

sending the control message to a virtual switch corresponding to a client so that the virtual switch generates a message conversion rule based on the control message to direct a subflow corresponding to a main flow to the target server without passing through the load balancing device.

9. An electronic device, comprising: one or more processors; a memory; and one or more computer programs; wherein the one or more computer programs are stored in the memory; wherein the one or more processors, when executing the one or more computer programs, cause the electronic device to implement the network load balancing method according to claim 8.

10. A non-transitory computer storage medium, comprising computer instructions which, when being performed on an electronic device, cause the electronic device to perform the network load balancing method according to claim 8.

11. A network load balancing system, comprising a virtual switch corresponding to a client, the virtual switch comprises:

a processor;

a memory, storing one or more computer programs, wherein the one or more computer programs, when being executed, cause the processor to perform a network load balancing method comprising:

receiving a first message, the first message comprising: first source device information, first destination device information, subflow identification information of a Multi-Path Transmission Control Protocol (MPTCP) type, and verification information, the verification information being used for indicating a main flow corresponding to a subflow identified by the subflow identification information, wherein the first destination device information of the first message is device information of the client or a load balancing device;

determining a target flow direction of the first message according to the first destination device information;

determining a message conversion rule according to the verification information and the target flow direction of the first message, the message conversion rule being used for directing the subflow and the main flow to a same target server;

converting the first source device information or the first destination device information in the first message based on the message conversion rule to obtain a second message, the second message comprising second source device information and second destination device information;

sending the second message to a second destination device according to the second destination device information in the second message without passing through the load balancing device, wherein the determining a message conversion rule according to the verification information and the target flow direction of the first message comprises:

if the target flow direction of the first message indicates that the message is to be sent to the load balancing device, then determining a target server corresponding to the main flow according to the verification information, and determining that the message conversion rule is used for converting the first destination device information in the first message from device information of the load balancing device into device information of the target server; and if the target flow direction of the first message indicates that the message is to be sent to a client, then determining that the message conversion rule is used for converting the first source device information in the first message from the device information of the target sever into the device information of the load balancing device.

12. The network load balancing system according to claim 11, further comprising a load balancing device, the load balancing device comprising:

a processor; and a memory, storing one or more computer programs, wherein the one or more computer programs, when being executed, cause the processor to perform a network load balancing method comprising:

receiving a connection establishment response, the connection establishment response comprising main flow identification information of a Multi-Path Transmission Control Protocol (MPTCP) type, device information of a target server, and a key;

generating verification information according to the key;

generating a control message according to the verification information and the device information of the target server, the control message comprising the verification information and the device information of the target server;

sending the control message to a virtual switch corresponding to a client so that the virtual switch generates a message conversion rule based on the control message to direct a subflow corresponding to a main flow to the target server.

13. The network load balancing system according to claim 11, wherein, before the determining a target flow direction of the first message according to the first destination device information, the network load balancing method further comprising:

determining that the first message is a subflow according to the subflow identification information of the MPTCP type;

acquiring a target server to which the main flow corresponding to the verification information is directed from a database according to the verification information;

generating the message conversion rule corresponding to the verification information according to the device information of the target server, the message conversion rule comprising: if the target flow direction of the first message indicates that the message needs to be sent to the load balancing device, then converting the first destination device information in the first message into the device information of the target server; if the target flow direction of the first message indicates that the message needs to be sent to the client, then converting the first source device information in the first message into the device information of the load balancing device.

14. The network load balancing system according to claim 13, wherein, before receiving a first message, the network load balancing method further comprising:

receiving control information sent by the load balancing device, the control information comprising the verification information and the device information of the target server;

storing the control information in the database.

15. The network load balancing system according to claim 13, wherein, after the generating the message conversion rule corresponding to the verification information according to the device information of the target server, the network load balancing method further comprising:

starting a timer, and deleting the message conversion rule after the timer expires.

\* \* \* \* \*